US005288594A

United States Patent [19]

Manthey et al.

[11] Patent Number: 5,288,594

[45] Date of Patent: Feb. 22, 1994

[54] PHOTOGRAPHIC ELEMENT AND PROCESS COMPRISING A DEVELOPMENT INHIBITOR RELEASING COUPLER AND A YELLOW DYE-FORMING COUPLER

[75] Inventors: Joseph W. Manthey; David M. Niklewicz; Richard P. Szajewski, all of Rochester, N.Y.

[73] Assignee: Eastman Kodak Company, Rochester, N.Y.

[21] Appl. No.: 37,951

[22] Filed: Mar. 26, 1993

Related U.S. Application Data

[63] Continuation of Ser. No. 708,546, May 31, 1991, abandoned.

[51] Int. Cl.$^5$ .......................... C03C 7/30; C03C 7/34; C03C 7/36; C03C 7/32

[52] U.S. Cl. .................................... 430/382; 430/543; 430/544; 430/549; 430/553; 430/557; 430/955

[58] Field of Search ............... 430/543, 544, 549, 382, 430/955, 553, 557

[56] References Cited

U.S. PATENT DOCUMENTS 4,859,578 8/1989 Michno et al. ...................... 430/544
4,912,024 3/1990 Michno et al. ...................... 430/544
4,959,299 9/1990 Sakanoue et al. .................. 430/544
4,980,267 12/1990 Taber ................................ 430/544
5,063,145 11/1991 Sakanoue et al. .................. 430/955
5,135,839 8/1992 Sakanoue et al. .................. 430/544

*Primary Examiner*—Richard L. Schilling
*Attorney, Agent, or Firm*—Arthur E. Kluegel

[57] ABSTRACT

A combination of a development inhibitor releasing coupler having a particular releasable mercaptotetrazole group; a concentration within the range of 2.5 to 25 mg/m$^2$, that does not accelerate bleaching of the element upon exposure and processing, of a dye-forming naphtholic or acetanilide coupler comprising a coupling-off group represented by the formula $$-(TIME)_n-S-R^1-SOL$$

as described in the specification, with a particular alkoxy-benzoyl yellow dye-forming coupler also as described in the specification in a photographic silver halide element and process enables improved dye images upon exposure and processing.

10 Claims, No Drawings

PHOTOGRAPHIC ELEMENT AND PROCESS COMPRISING A DEVELOPMENT INHIBITOR RELEASING COUPLER AND A YELLOW DYE-FORMING COUPLER

This is a continuation of application Ser. No. 07/708,546, filed May 31, 1991, now abandoned.

This invention relates to a photographic element and process comprising a particular development inhibitor releasing coupler combination and a particular yellow dye-forming coupler.

Images are commonly obtained in the photographic art by a coupling reaction between the development product of a silver halide color developing agent, particularly an oxidized aromatic primary amino developing agent, and a color forming compound commonly described as a coupler. The dyes formed depend upon the composition of the chemical composition of the coupler and the developing agent. The subtractive process is commonly employed in multicolor photographic elements and the resulting image dyes are typically cyan, magenta and yellow dyes that are formed in or adjacent to silver halide layers sensitive to the radiation complementary to the radiation absorbed by the image dye.

One of the ways recognized in the photographic art for improving the quality of such dye images formed in color photographic silver halide elements includes improvement of graininess, . sharpness and color tonal rendition of such images by the use of compounds capable of providing a diffusible development inhibitor moiety as a function of silver halide development. These compounds are typically described in the patent and technical literature as development inhibitor releasing compounds or couplers (DIR compounds and DIR couplers). Such representative DIR compounds and DIR couplers are described in., for example, U.S. Pat. Nos. 3,227,554; 3,701,783; 3,615,506; 3,617,291; 3,379,529; 3,620,746; 3,384,657; 3,733,201; 4,248,962; and 4,409,323. Within these DIR couplers is a class of coupler that enables release of the development inhibitor moiety by means of an anchimeric release mechanism. This class of DIR couplers is typically described as DIAR couplers and includes those described in, for example, U.S. Pat. No. 4,248,962.

One class of DIR compounds and couplers is described in U.K Patent Specification 2,099,167 that involves design of the development inhibitor molecule to enable the inhibitor moiety to form a species that is inactive as a development inhibitor in the processing solution after the inhibitor moiety is diffused from the element into such a solution. Such couplers described in U.K. Patent Specification 2,099,167 include, for example, DIAR couplers. While many of such DIR compounds and couplers, including DIAR couplers, are effective for such purposes, such as described in U.S. Pat. No. 4,980,267, the combination of such DIR couplers with known yellow dye forming couplers does not provide the desired combination of the desired effects, especially desired effects with a commercial developer, for example, those used in the C-41 Process of Eastman Kodak Co., U.S.A. (described in, for example, *British Journal of Photography,* 1988, pages 196-198).

The constituency of the developer solution for any particular multilayer silver halide material is, firstly, defined by the formulae for its developer, developer replenisher, and/or developer regenerator solutions and is, secondly, defined by the operational details for using said solutions. Freshly prepared working-tank developer solutions for the C-41 Process are an example of a typical developer solution. Cost, service time, and ecological pressures on commercial processing laboratories demand that each roll of film cannot be processed in a fresh developer, necessitating wide-spread use of replenished developers. The long-standing practice of developer replenishment involves metering a replenisher solution to the film processor at a flow rate that permits attainment of the aforementioned constituency, oxidation and evaporation factors being taken into account. By convention, the replenisher concentration is higher than the aim working-tank concentration for chemicals used up by the dye-forming process, and is lower for chemicals released by the dye forming process. Notable examples of the latter class of chemical compounds are halides.

Assuming proper operation, replenished (or regenerated) developers can be used for an extended period of time, processing many thousands of rolls of film. Such developers are commonly referred to as "seasoned". Such seasoned developers match, within close tolerance, the intended fresh developer formula for color developing agent and halide content, but differ from fresh developer by virtue of the presence of a large number of "seasoning products", materials which leach from the film into the developer solution while processing takes place. Such seasoning products (beyond Br[-] and I[-]) include: inhibitor fragments from DIR and DI(A)R couplers, surfactants, inter-grain absorber dyes, and solvents, plus decomposition and reaction by-products. Some of these seasoning products can be photographically active, creating a fresh-to-seasoned offset in image dye formation. Minimization of the impact of seasoning products other than halides on image dye formation has been desirable without adversely affecting other properties, such as desired interimage effects.

It has been found that the described advantages can be provided by a color photographic element comprising a support bearing at least one yellow image dye-forming photographic silver halide emulsion layer (A); at least one layer (B) adjacent to the layer (A); at least one yellow image dye-forming coupler; at least one photographic development inhibitor releasing coupler; and, in at least one of layer (A) and layer (B), a concentration, within the range of 2.5 to 25 mg/m$^2$, that does not accelerate bleaching of the element upon exposure and processing, of a dye-forming acetanilide or naphtholic coupler comprising a coupling-off group represented by the formula $$-(TIME)_n-S-R^1-SOL$$

wherein TIME represents a timing group; n is 0 or 1; $R^1$ is a divalent aliphatic group comprising 1 to 8 carbon atoms; and SOL represents a water solubilizing group.

A preferred naphtholic or acetanilide dye-forming coupler as described comprises a coupling-off group that is a mercaptoalkanoic acid containing 1 to 8 carbon atoms, especially mercaptopropionic acid.

A preferred combination of couplers as described comprises a combination of at least one yellow image dye-forming coupler and at least one development inhibitor releasing coupler as described in U.S. Pat. No. 4,980,267, the disclosures of which are incorporated herein by reference, with a concentration as described of a naphtholic or acetanilide coupler comprising a coupling-off group consisting of $-SCH_2COOH$; $-SCH_2CH_2COOH$; $-SCH_2CH_2CH_2COOH$; and

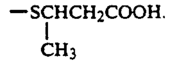

The photographic effect that results from adding the described naphtholic or acetanilide coupler to the imaging layer containing the most light-sensitive blue emulsion, or to an adjacent layer, is precisely opposite the expected effect with a bleach-accelerator-releasing coupler: adding yellow coloration to the film with seasoned processes rather than deleting yellow coloration due to the removal of fine metallic silver particles.

The photographic development inhibitor releasing coupler, herein described as DIAR coupler I, is preferably represented by the formula:

DIAR I

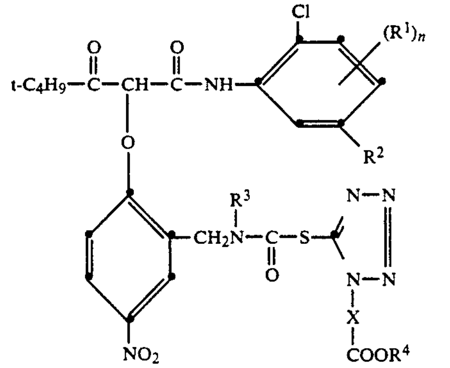

wherein $R^1$ is a substituent that does not adversely affect the development inhibitor releasing properties of the coupler, such as an unsubstituted or substituted alkyl group;

n is 0, 1 or 2;

$R^2$ is a ballast group;

$R^3$ is unsubstituted or substituted alkyl, such as methyl, ethyl, propyl, t-butyl or n-butyl; or unsubstituted or substituted aryl, such as phenyl;

$R^4$ is alkyl containing 2 to 5 carbon atoms, such ethyl, propyl, butyl and pentyl; and X is alkylene containing 1 to 3 carbon atoms, such as methylene ($-CH_2-$), ethylene ($-CH_2-CH_2-$) and propylene ($-CH_2-CH_2-CH_2-$); and the yellow dye-forming coupler is preferably represented by the formula:

(Y-I)

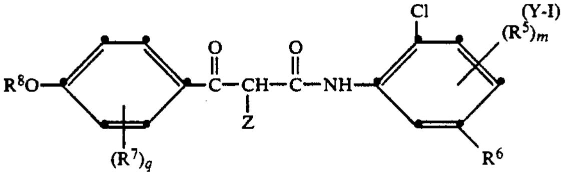

wherein $R^5$ and $R^7$ are individually substituted or unsubstituted alkyl, such as methyl, ethyl, propyl or butyl, or substituted or unsubstituted aryl, such as phenyl, or benzyl; or alkoxy, such as alkoxy containing 1 to 30 carbon atoms, for example, methoxy, ethoxy, butoxy, propoxy and decyloxy;

m and q are individually 0, 1 or 2;

$R^6$ is a ballast group;

$R^8$ is unsubstituted or substituted alkyl, such as methyl, ethyl, propyl, butyl, hexyl and octyl;

Z is a coupling-off group that is

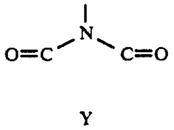

wherein Y represents the atoms necessary to complete an unsubstituted or substituted five member heterocyclic ring, such as the atoms

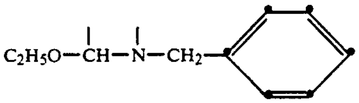

or

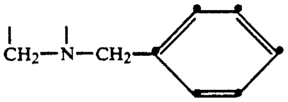

The described photographic element preferably comprises a support bearing at least one red-sensitive silver halide emulsion layer comprising a phenolic cyan dye-forming coupler having in the 2-position a para-cyanophenylureido group; at least one green-sensitive silver halide emulsion layer comprising a pyrazolo[3,2-c]-s-triazole magenta dye-forming coupler, a ballast group in the 3-position, particularly one having a terminal carboxy group, and a coupling-off group in the 7-position; and at least one blue-sensitive silver halide emulsion layer comprising a yellow dye-forming coupler as described above and in at least one of the yellow dye-forming layers of the photographic element a combination of couplers as described.

Combinations of DIAR couplers within the formula DIAR I can be used if desired. Also, combinations of yellow dye-forming couplers within the formula Y-I can be used if desired.

The described DIAR coupler I contains a coupling-off group that enables desired control over the time of release of the development inhibitor moiety and the rate of release of the development inhibitor moiety. The coupling-off group structure between the coupling position and the sulfur atom of the development inhibitor moiety functions as a timing group for release of the development inhibitor moiety. The reaction of the DIAR coupler I with oxidized color developing agent cleaves the bond between the timing group and the coupling moiety. Then an intramolecular nucleophilic displacement reaction cleaves the bond between the development inhibitor moiety and the timing group. This sequence of reactions takes place at the appropriate time during processing to enable the yellow dye image to form from the described yellow dye-forming coupler and enable desired interimage effects.

As used herein the term "coupler" refers to the entire compound including the coupler moiety and the coupling-off group. The term coupler moiety refers to that portion of the compound other than the coupling-off group.

A preferred development inhibitor releasing coupler is represented by the formula:

DIAR II

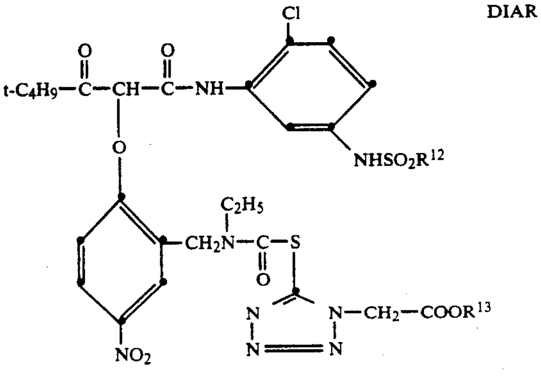

wherein $R^{12}$ is alkyl containing 8 to 32 carbon atoms; and $R^{13}$ is alkyl containing 2 to 5 carbon atoms.

A ballast group as described herein is an organic radical of such size and configuration as to confer on the coupler molecule sufficient bulk to render the coupler substantially non-diffusible from the layer in which it is coated in the described photographic element. Coupler moieties as described can be attached to ballast groups, or to polymeric chains through one of the groups on the anilide portion of the coupler moiety. Representative ballast groups include substituted or unsubstituted alkyl or aryl groups containing 8 to 40 carbon atoms; sulfonamido groups containing 8 to 40 carbon atoms (—NH-$SO_2R$); sulfamyl groups containing 8 to 40 carbon atoms (—$SO_2NHR$); carbonamido groups containing 8 to 40 carbon atoms (—NHCOR); carbamoyl groups containing 8 to 40 carbon atoms (—NHCOOR); ester groups containing 8 to 40 carbon atoms (—COOR); alkoxy groups containing 8 to 40 carbon atoms; aryloxy groups. Representative substituents on such groups include alkyl, aryl, alkoxy, aryloxy, alkylthio, hydroxy, halogen, alkoxycarbonyl, aryloxycarbonyl, carboxy, acyl, acyloxy, amino, anilino, carbonamido, carbamoyl, alkylsulfonyl, arylsulfonyl, sulfonamido, and sulfamyl groups wherein the substituents typically contain 1 to 40 carbon atoms, such as 8 to 32 carbon atoms. Such substituents can also be further substituted with such groups.

The described yellow dye-forming coupler enables formation of a yellow dye image that has particularly high dye extinction. A preferred yellow dye-forming coupler within the described formula is represented by the formula:

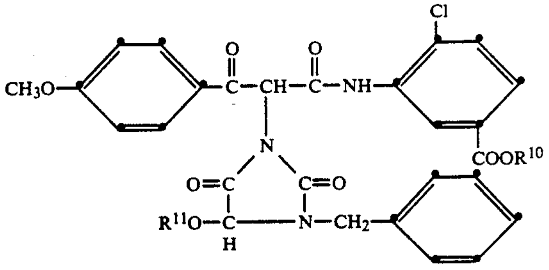

wherein $R^{10}$ is alkyl containing 8 to 32 carbon atoms; and, $R^{11}$ is alkyl containing 2 to 4 carbon atoms.

Examples of preferred yellow dye-forming couplers are:

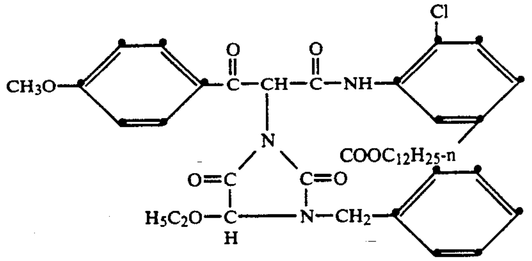

and

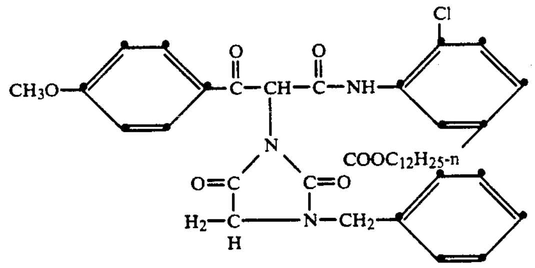

The described combination of couplers can be used in a photographic silver halide element comprising at least one layer sensitive to the blue region of the spectrum. The described element can also contain a layer or layers sensitive to other regions of the spectrum. For example, the photographic element can contain at least one red-sensitive silver halide emulsion layer containing at least one cyan dye-forming coupler. Such cyan dye-forming couplers are preferably phenols or naphthols. Representative cyan dye-forming couplers are described in, for example, the following patents and publications: U.S. Pat. Nos. 2,772,162; 2,895,826; 3,002,836; 3,034,892; 2,474,293; 2,423,730; 2,367,531; 3,041,236 and 4,333,999 and "Farbkuppler-eine Literaturubersicht", published in Agfa Mitteilungen Band III, pp. 156-175 (1961).

The described photographic element can also contain a layer or layers that are sensitive to the green region of the spectrum and contain at least one magenta dye-forming coupler. Preferred couplers that form magenta dyes upon reaction with oxidized color developing agent are pyrazolones, pyrazolotriazoles, pyrazolobenzimidazoles and indazolones. Representative couplers that form magenta dyes are described in, for example: U.S. Pat. Nos. 2,600,788; 2,369,489; 2,343,703; 2,311,082; 2,673,801; 3,152,896; 3,519,429; 3,061,432;

3,062,653; 3,725,067; and 2,908,573 and "Farbkuppler-eine Literaturubersicht", published in Agfa Mitteilungen, Band III, pages 126-156 (1961). A preferred magenta dye-forming coupler is a pyrazolo[3,2-c]-s-triazole, such as described in EP 285,274 and EP 284,270, the disclosures of which are expressly incorporated herein by reference. Examples of such preferred magenta dye-forming couplers are:

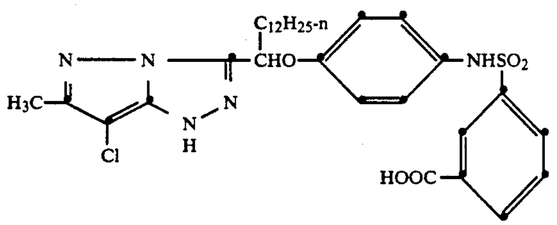

or

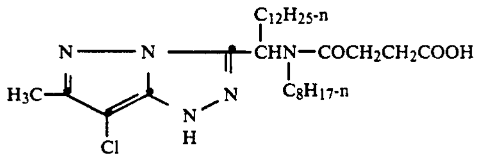

While it is highly preferred to use the described yellow dye-forming couplers as the only yellow image dye-forming coupler in the described blue-sensitive silver halide emulsion layer, it is possible to use other yellow dye-forming couplers in combination with the described yellow dye-forming couplers. Such other yellow dye-forming couplers are preferably acylacetanilides such as benzoylacetanilides.

The described red-sensitive layer or layers and green-sensitive layer or layers can comprise DIR compounds or couplers, particularly DIAR compounds or DIAR couplers, that enable desired interimage effects for these layers. For example, these layers can comprise DIAR couplers that are within those described in U.S. Pat. No. 4,248,962 and development inhibitor releasing couplers within U.S. Pat. No. 4,409,323. A preferred DIAR coupler in the green-sensitive layer and/or in A layer that is contiguous to the green-sensitive layer is a DIAR coupler as described that is within U.S. Pat. No. 4,782,012.

The compounds employed in this invention can be prepared by synthetic procedures known in the art. In the case of the DIAR coupler I, the synthesis involves first attaching the timing group to the appropriate coupler moiety followed by the attachment of the appropriate derivative of the inhibitor group to form the desired DIAR coupler. Optionally, the timing group can be attached to the coupler moiety after first combining the timing group and the inhibitor moiety by an appropriate reaction. The inhibitor moiety can be synthesized according to the scheme shown in J. Heterocyclic Chem., 15, 981 (1978).

The described yellow dye-forming coupler can also be prepared by synthetic procedures known in the art, such as described in U.S. Pat. No. 4,022,620.

The naphtholic or acetanilide dye-forming coupler is as described in, for example, EP 193,389 and U.S. Pat. No. 4,912,024. For example, the naphtholic or acetanilide dye-forming coupler is

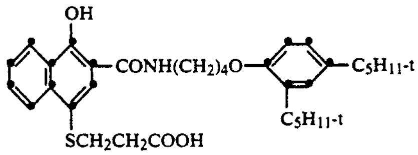

or

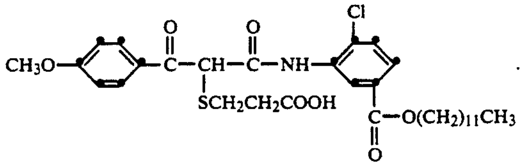

The described couplers can be used and incorporated in photographic elements in the way that couplers have been used and incorporated in photographic elements in the photographic art. The described photographic element is preferably a multicolor element. Multicolor elements preferably contain dye image-forming units sensitive to each of the three primary regions of the visible spectrum. Each unit can be comprised of a single emulsion layer or of multiple emulsion layers sensitive to a given region of the spectrum.

The couplers of this invention can be incorporated in silver halide emulsions and the emulsions can be coated on a support to form a photographic element. Alternatively, at least one of the couplers can be incorporated in photographic elements adjacent the silver halide emulsion where, during development, the coupler will be in reactive association with development products such as oxidized color developing agent.

A typical multicolor photographic element comprises a support bearing a cyan dye image-forming unit comprising at least one red-sensitive silver halide emulsion layer having -associated therewith at least one cyan dye-forming coupler, a magenta image-forming unit comprising at least one green-sensitive silver halide emulsion layer having associated therewith at least one magenta dye-forming coupler and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like.

In the following discussion of suitable materials for use in the elements of this invention, reference will be made to *Research Disclosure*, December, 1989, Item No. 306108 and December, 1978, item No. 17643, published by Kenneth Mason Publications, Ltd., The Old Harbourmaster's, 8 North Street, Emsworth, Hampshire P010 7DD, ENGLAND, the disclosures of which are incorporated herein by reference. This publication will be identified hereafter by the term *Research Disclosure*.

The silver halide emulsions employed in the elements of this invention can be comprised of silver bromide, silver chloride, silver iodide, silver chlorobromide, silver chloroiodide, silver bromoiodide, silver chlorobromoiodide or mixtures thereof. The emulsions can include silver halide grains of any conventional shape or size. Specifically, the emulsions can include coarse, medium or fine silver halide grains. High aspect ratio tabular grain emulsions are specifically contemplated, such as those disclosed by Wilgus et al U.S. Pat. No. 4,434,226, Daubendiek et al U.S. Pat. No. 4,414,310, Wey U.S. Pat. No. 4,399,215, Solberg et al U.S. Pat. No. 4,433,048, Mignot U.S. Pat. No. 4,386,156, Evans et al U.S. Pat. No. 4,504,570, Maskasky U.S. Pat. No. 4,400,463, Wey et al U.S. Pat. No. 4,414,306, Maskasky U.S. Pat. Nos. 4,435,501 and 4,643,966 and Daubendiek et al U.S. Pat. Nos. 4,672,027 and 4,693,964. Also specifically contemplated are those silver bromoiodide grains with a higher molar proportion of iodide in the core of the grain than in the periphery of the grain, such as those described in GB 1,027,146; JA 54/48,521; U.S. Pat. No. 4,379,837; U.S. Pat. No. 4,444,877; U.S. Pat. No. 4,665,012; U.S. Pat. No. 4,686,178; U.S. Pat. No. 4,565,778; U.S. Pat. No. 4,728,602; U.S. Pat. No. 4,668,614; U.S. Pat. No. 4,636,461; EP 264,954. The silver halide emulsions can be either monodisperse or polydisperse as precipitated. The grain size distribution of the emulsions can be controlled by silver halide grain separation techniques or by blending silver halide emulsions of differing grain sizes.

Sensitizing compounds, such as compounds of copper, thallium, lead, bismuth, cadmium and Group VIII noble metals, can be present during precipitation of the silver halide emulsion.

The emulsions can be surface-sensitive emulsions, i.e., emulsions that form latent images primarily on the surfaces of the silver halide grains, or internal latent image-forming emulsions, i.e., emulsions that form latent images predominantly in the interior of the silver halide grains. The emulsions can be negative-working emulsions, such as surface-sensitive emulsions or unfogged internal latent image-forming emulsions, or direct-positive emulsions of the unfogged, internal latent image-forming type, which are positive-working when development is conducted with uniform light exposure or in the presence of a nucleating agent.

The silver halide emulsions can be surface sensitized. Noble metal (e.g., gold), middle chalcogen (e.g., sulfur, selenium, or tellurium), and reduction sensitizers, employed individually or in combination, are specifically contemplated. Typical chemical sensitizers are listed in *Research Disclosure,* Item 17643, cited above, Section III.

The silver halide emulsions can be spectrally sensitized with dyes from a variety of classes, including the polymethine dye class, which includes the cyanines, merocyanines, complex cyanines and merocyanines (i.e., tri-, tetra-, and polynuclear cyanines and merocyanines), oxonols, hemioxonols, styryls, merostyryls, and streptocyanines. Illustrative spectral sensitizing dyes are disclosed in *Research Disclosure,* Item 17643, cited above, Section IV.

Suitable vehicles for the emulsion layers and other layers of elements of this invention are described in Research Disclosure Item 17643, Section IX and the publications cited therein.

In addition to the couplers described herein the elements of this invention can include additional couplers as described in Research Disclosure Section VII, paragraphs D, E, F and G and the publications cited therein. These additional couplers can be incorporated as described in Research Disclosure Section VII, paragraph C and the publications cited therein.

The photographic elements of this invention can contain brighteners (Research Disclosure Section V), antifoggants and stabilizers (Research Disclosure Section VI), antistain agents and image dye stabilizers (Research Disclosure Section VII, paragraphs I and J), light absorbing and scattering materials (Research Disclosure Section VIII), hardeners (Research Disclosure Section X), coating aids (Research Disclosure Section XI), plasticizers and lubricants (Research Disclosure Section XII), antistatic agents (Research Disclosure Section XIII), matting agents (Research Disclosure Section XVI) and development modifiers (Research Disclosure Section XXI).

The photographic elements can be coated on a variety of supports as described in Research Disclosure Section XVII and the references described therein.

Photographic elements can be exposed to actinic radiation, typically in the visible region of the spectrum, to form a latent image as described in Research Disclosure Section XVIII and then processed to form a visible dye image as described in Research Disclosure Section XIX. Processing to form a visible dye image includes the step of contacting the element with a color developing agent to reduce developable silver halide and oxidize the color developing agent. Oxidized color developing agent in turn reacts with the coupler to yield a dye.

Preferred color developing agents are p-phenylene diamines. Especially preferred are 4-amino-3-methyl-N,N-diethylaniline hydrochloride, 4-amino-3-methyl-N-ethyl-N-$\beta$-(methanesulfonamido)ethylaniline sulfate hydrate, 4-amino-3-methyl-N-ethyl-N-$\beta$-hydroxyethylaniline sulfate, 4-amino-3-$\beta$-(methanesulfonamido)ethyl-N,N-diethylaniline hydrochloride and 4-amino-N-ethyl-N-(2-methoxyethyl)-m-toluidine di-p-toluene sulfonic acid.

With negative-working silver halide, the processing step described above provides a negative image. The described elements are preferably processed in the known C-41 color process as described in, for example, the British Journal of Photography Annual of 1988, pages 196–198. To provide a positive (or reversal) image, the color development step can be preceded by development with a non-chromogenic developing agent to develop exposed silver halide, but not form dye, and then uniformly fogging the element to render unexposed silver halide developable. Alternatively, a direct positive emulsion can be employed to obtain a positive image.

Development is followed by the conventional steps of bleaching, fixing, or bleach-fixing, to remove silver or silver halide, washing, and drying.

The following examples are included for a further understanding of the invention.

EXAMPLE 1

On a cellulose triacetate film support were coated the following layers in reverse order: (coverages are in milligrams per foot squared).

| | | Materials | | | |
|---|---|---|---|---|---|
| Layer | Gelatin | Silver Halide | Image Couplers | Image Modifying Couplers | Misc. Materials |
| 1-SOC | 82.5 | — | — | — | 3.5 Matte |
| 2-UV | 50 | 20 (A) | — | — | 20 UV Absorbers |
| 3-FY | 73.5 | 40 (B) | 32 (Z-1) | 8.8 (K-1) | |
| 4-SY | 161 | 27 (C) | 80 (Z-1) | 15.6 (K-1) | |
| 5-CLS | 80 | | — | — | 3 Ag (CLS) 5 Scavenger for Oxidized Developer |
| 6-FM | 156 | 50 (E) 70 (F) | 24 (Y) | 5 (L) | |

-continued

| | | | | | |
|---|---|---|---|---|---|
| 7-SM | 167 | 42 (G)<br>46 (H) | 14.5 (Y) | — | 10 Colored Masking Coupler (X) |
| 8-IL | 120 | — | — | — | 5 Scavenger for Oxidized Developer |
| 9-FC | 146.5 | 75 (I) | 9.5 (W) | 9.5 (M)<br>9.5 (N) | |
| 10-SC | 274 | 75 (J)<br>75 (K) | 97 (W) | 6 (M) | |
| 11-AHU | 250 | — | — | — | 30 Ag (Metallic Ag)<br>10 Scavenger for Oxidized Developer |

Description of Silver Halide Materials Used:

| Emulsion | Morphology | Grain Diameter (microns) (For T-Grains (Diameter/Thickness) | % Br/% I |
|---|---|---|---|
| (A) | Conventional | 0.07 | 100/0 |
| (B) | T-Grain | 1.2/0.115 | 97/3 |
| (C) | T-Grain | 0.6/0.11 | 97/3 |
| (D) | T-Grain | 0.45/0.08 | 98.5/1.5 |
| (E) | T-Grain | 1.0/0.115 | 97/3 |
| (F) | T-Grain | 0.75/0.13 | 97/3 |
| (G) | T-Grain | 0.55/0.08 | 94/6 |
| (H) | T-Grain | 0.45/0.08 | 98.5/1.5 |
| (I) | T-Grain | 1.4/0.115 | 94/6 |
| (J) | T-Grain | 0.75/0.13 | 97/3 |
| (K) | Cubic | 0.31 | 96.5/3.5 |

The structures of the designated couplers are as follows:

Z-1 =
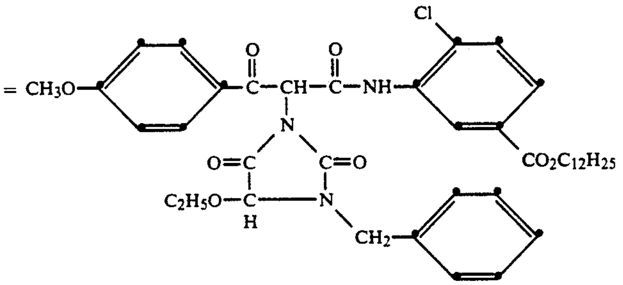

Y =
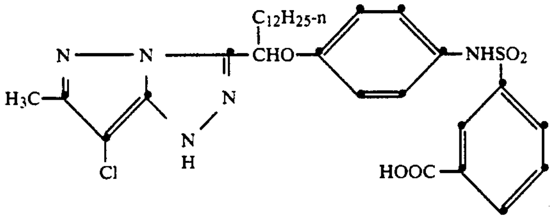

X =
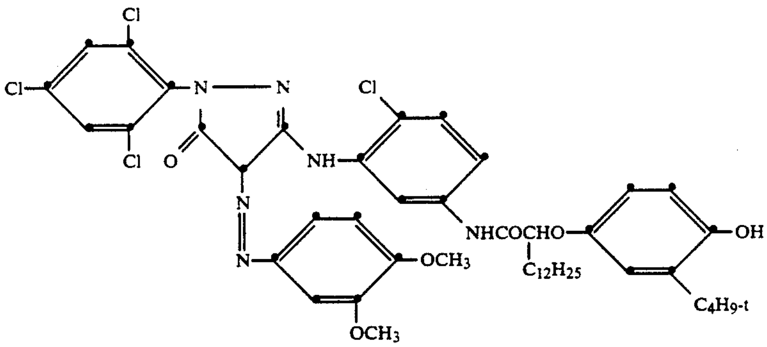

W =
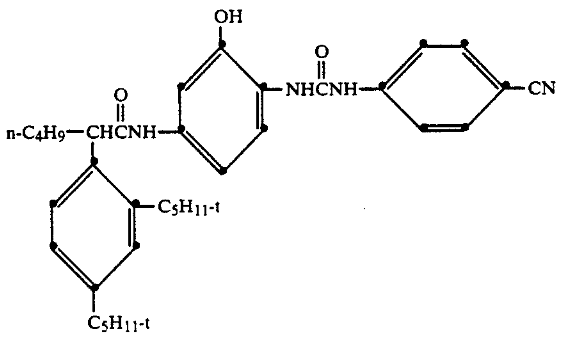

-continued
K-1 = 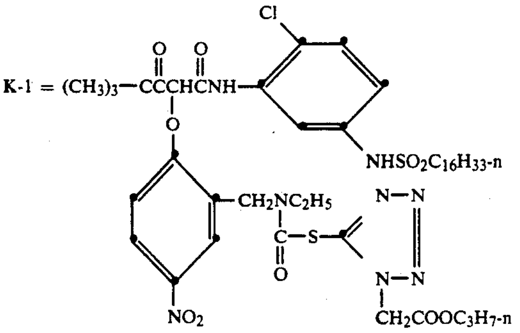
L = 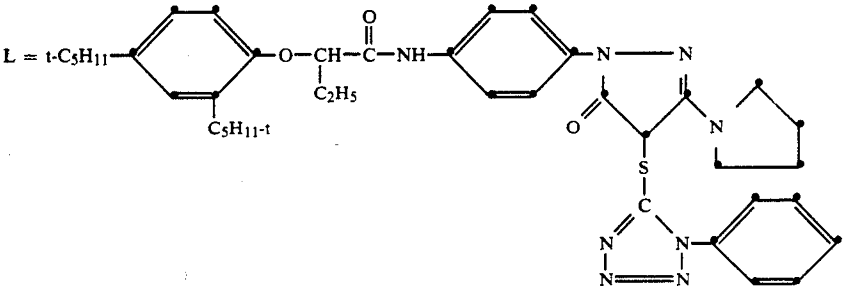
M = 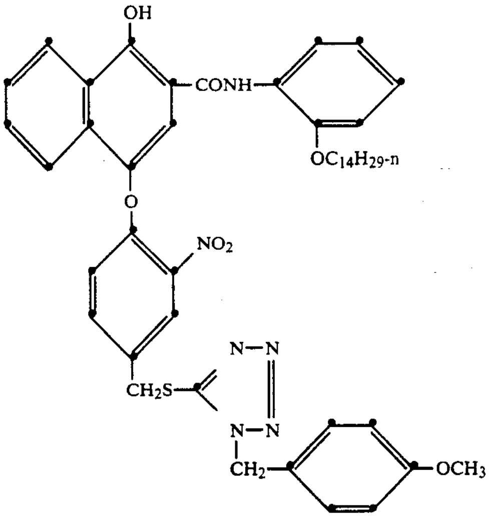
N = 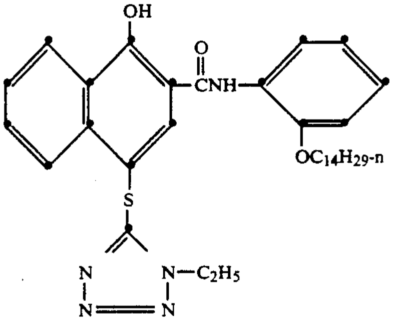

-continued

K-2 =

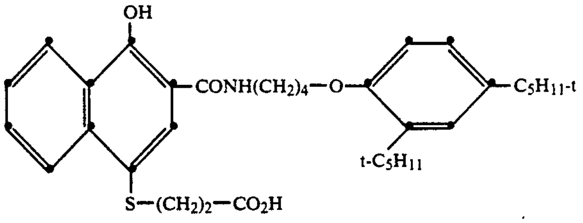

Z-2 =

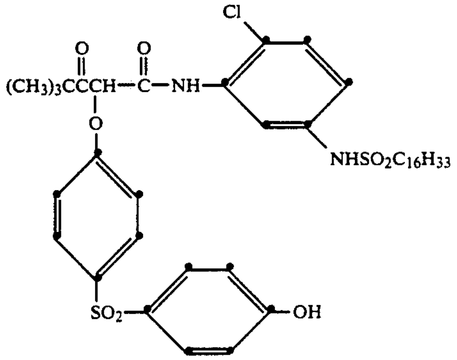

P =

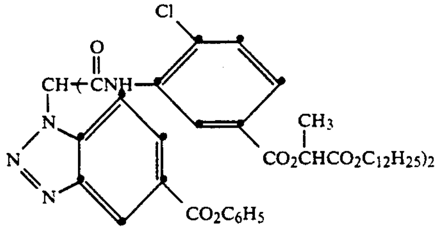

The resulting photographic silver halide films were imagewise exposed to light and then processed in a C-41 process of Eastman Kodak Co., U.S.A., with fresh developer and seasoned developer. The results were as follows: (Tables I, II and III)

TABLE I

| Yellow Image Coupler | Image Modifier | Coupler K-2 (mg/sq. ft.) | Coupler K-2 Location | Delta Blue Density |
|---|---|---|---|---|
| | | | (Fresh minus Seasoned Process) | |
| Z-1 | K-1 | 0 | None | 0.20 |
| Z-1 | K-1 | 1 | FY | 0.02 |
| Z-1 | None | 0 | None | 0.15 |
| Z-1 | None | 1 | FY | 0.06 |
| Z-2 | K-1 | 0 | None | 0.15 |
| Z-2 | K-1 | 1 | FY | 0.02 |
| Z-2 | None | 0 | None | 0.19 |

TABLE II

| Yellow Image Coupler | Image Modifier | Coupler K-2 (mg/sq. ft.) | Coupler K-2 Location | Delta Blue Density |
|---|---|---|---|---|
| | | | (Fresh minus Seasoned Process) | |
| Z-1 | K-1 | 0 | None | 0.20 |
| Z-1 | K-1 | 1 | FY | 0.02 |
| Z-1 | K-1 | 1 | SY | 0.04 |
| Z-1 | K-1 | 1 | between FW and top coat | 0.03 |
| Z-1 | K-1 | 1 | in CLS (between SY and FM) | 0.13 |
| Z-1 | K-1 | 5 | in CLS (between SY | 0.03 |

TABLE II-continued

| Yellow Image Coupler | Image Modifier | Coupler K-2 (mg/sq. ft.) | Coupler K-2 Location | Delta Blue Density |
|---|---|---|---|---|
| | | | and FM) | |

TABLE III

| Yellow Image Coupler | Image Modifier | Coupler K-2 (mg/sq. ft.) | Coupler K-2 Location | Delta Blue Density |
|---|---|---|---|---|
| | | | (Fresh minus Seasoned Process) | |
| Z-1 | K-1 | 0 | None | 0.17 |
| Z-1 | K-1 | 0.5 | FY | −0.03 |
| Z-1 | P | 0 | None | 0.08 |
| Z-1 | P | 0.5 | FY | 0.02 |

The photographic silver halide films of the invention within Tables I, II and III provided unexpected advantages in both fresh and seasoned processing solutions.

The images formed by the photographic silver halide films according to the invention within Tables I, II and III also showed desired interimage effects.

The invention has been described in detail with particular reference to preferred embodiments thereof, but it will be appreciated that variations and modifications can be effected within the spirit and scope of the invention.

What is claimed is:

1. A color photographic element comprising a support bearing at least one yellow image dye-forming photographic silver halide emulsion layer (A); at least one layer (B) adjacent to the layer (A); at least one yellow image dye-forming coupler; at least one photographic development inhibitor releasing coupler; and, in at least one of layer (A) and layer (B), a concentration, within the range of 2.5 to 25 mg/m$^2$, that does not accelerate bleaching of the element upon exposure and processing, of a dye-forming naphtholic or acetanilide coupler comprising a coupling-off group represented by the formula $$-(TIME)_n-S-R^1-SOL$$

wherein TIME represents a timing group; n is 0 or 1; $R^1$ is a divalent aliphatic group comprising 1 to 8 carbon atoms; and SOL represents a water solubilizing group.

2. A color photographic element as in claim 1 wherein the naphtholic or acetanilide dye-forming coupler comprises a coupling-off group that is a mercaptoalkanoic acid containing 1 to 8 carbon atoms.

3. A color photographic element as in claim 1 wherein the naphtholic or acetanilide coupler is in layer (B).

4. A color photographic element as in claim 1 wherein the naphtholic or acetanilide coupler is in layer (A).

5. A color photographic element as in claim 1 wherein the naphtholic or acetanilide coupler comprises a coupling-off group selected from the group consisting of $-SCH_2COOH$; $-SCH_2CH_2COOH$; $-SCH_2CH_2CH_2COOH$; and

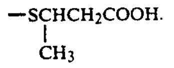

6. A color photographic element as in claim 1 wherein the naphtholic or acetanilide dye-forming coupler is

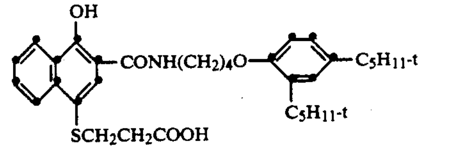

or

-continued

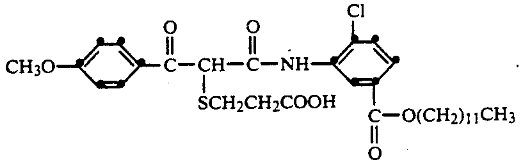

7. A color photographic element as in claim 1 comprising a support bearing at least one yellow image dye-forming photographic silver halide emulsion layer, at least one magenta image dye-forming photographic silver emulsion layer, and at least one cyan image dye-forming photographic silver halide emulsion layer.

8. A color photographic element as in claim 1 comprising a support bearing at least one yellow image dye-forming photographic silver halide emulsion layer (A) comprising a yellow image dye-forming coupler represented by the formula:

DIAR I

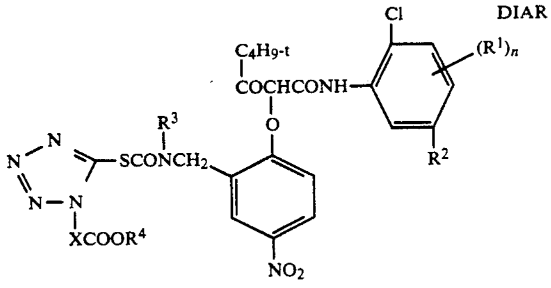

wherein $R^1$ is a substituent that does not adversely affect the development inhibitor releasing properties of the coupler;

n is 0, 1 or 2;

$R^2$ is a ballast group;

$R^3$ is unsubstituted or substituted alkyl or unsubstituted or substituted aryl;

$R^4$ is alkyl containing 2 to 5 carbon atoms; and

X is alkylene containing 1 to 3 carbon atoms; and in at least one layer (A) and layer (B), a concentration, within the range of 2.5 to 25 mg/m$^2$, that does not accelerate bleaching of the element upon exposure and processing, of a coupler of the formula:

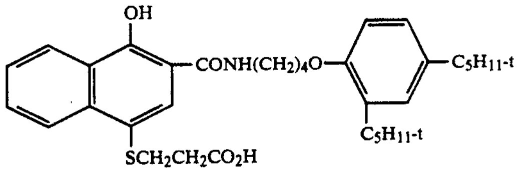

9. A process of forming a photographic image in an exposed photographic element as defined in claim 1 comprising developing said element with a photographic silver halide color developing agent.

10. A process of forming a photographic image in an exposed photographic element as defined in claim 6 comprising developing said element with a photographic silver halide color developing agent.

* * * * *